United States Patent [19]

Meline

[11] Patent Number: 4,988,372
[45] Date of Patent: Jan. 29, 1991

[54] METHOD AND DEVICE FOR FILTERING CONTAMINATED GASES LADEN WITH LIQUID VESICLES

[75] Inventor: Francois Meline, Paris, France

[73] Assignee: Societe Anonyme: Compagnie Generale des Mattieres Nucleaires, Velizy-villacoublay, France

[21] Appl. No.: 434,160

[22] Filed: Nov. 13, 1989

[51] Int. Cl.⁵ .............................................. B01D 46/00
[52] U.S. Cl. ....................................... 55/97; 55/267; 55/498; 55/523; 210/185
[58] Field of Search ................... 55/267, 268, 208, 97, 55/466, 502, 504, 523, 481, DIG. 9; 376/313, 314; 210/185

[56] References Cited

U.S. PATENT DOCUMENTS 2,808,124  10/1957  Attwood ............................... 55/267
4,338,102  7/1982  Otsuka et al. ......................... 55/208

FOREIGN PATENT DOCUMENTS 634763  11/1976  U.S.S.R. .............................. 210/185

Primary Examiner—Bernard Nozick
Attorney, Agent, or Firm—John R. Pegan

[57] ABSTRACT

In the method disclosed for filtering a contaminated gas laden with liquid vesicles (or aerosols) through a filter medium arranged around a center hollow through which the aerosol enters, the filter medium is heated to a temperature above the aerosol's dew point by a radiant heat source arranged in said center hollow. The inventive filter enables the said method to be practiced.

12 Claims, 2 Drawing Sheets

METHOD AND DEVICE FOR FILTERING CONTAMINATED GASES LADEN WITH LIQUID VESICLES

BACKGROUND OF THE INVENTION

This invention concerns a method and a device for filtering contaminated gas laden with liquid vesicles.

The gas contamination is due in whole or in part to liquid vesicles containing radioactive or toxic substances in dissolved state.

The liquid vesicles, i.e., a mist, result from a condition of supersaturation, the gas phase (or carrier gas) being saturated with the vapor of the liquid or liquids constituting the liquid vesicles.

In the case where the liquid is water, the carrier gas is referred to as humid or moist air.

Taken together, the particles in suspension in the carrier gas are called an aerosol.

The invention can find application in all industrial fields where the presence of contaminating substances precludes human access to the filtering means, and without any special precautions.

The invention is particularly worthwhile in a nuclear environment.

The problem of purifying gas contaminated by particles in suspension, i.e. an aerosol, is met especially in circuits for transferring liquids by air lift, and in particular those operating under a vacuum.

DESCRIPTION OF THE PRIOR ART

Such a circuit is represented in FIG. 1, where a pipe 1 connectes the tank 2 containing the liquid 3 to be raised to the separating pot 4 in which the liquid 3 is separated from the gas and withdrawn via the pipe 5.

The driving air causing the liquid to rise is blown in through the pipe 6.

The separation of the driving air from the liquid to be transferred creates an aerosol at the level of the separation pot.

The carrier gas of this aerosol, which exits via the pipe 7, consists of vapor-saturated air. The particles of the aerosol are active liquid vesicles having the composition of the transferred liquid. Said liquid is generally an aqueous solution laden with contaminating salts.

In the classic purification line represented in FIG. 1, the aerosol traverses a mist eliminator 8 (shown here as having parallel blades) designed to restrain or capture the bulk of the liquid vesicles (usually on the order of 80% of them at best), then flows through a filter 9. The filter acts as a barrier to the activity remaining in the aerosol both as concerns the fine vesicles (less than approximately $7\mu$) and/or the solid particles. The contaminating particles are retained by the filter medium contained in the filter.

This entire part of the installation is located in a cell separated from the exterior by a biological or radiological protection wall 10, access to the cell by humans being prevented. The vacuum circuit 11 placed downstream of the filter is on the other hand located in an accessible zone for the purpose of easy maintenance. Consequently, the gas 12 leaving the filter must absolutely have an activity compatible with the zone accessible to personnel.

Filter mediums are known in the prior art which are sufficiently efficient in filtering dry gases. But these have been observed to lose a considerable amount of efficiency when the gas to be filtered contains liquid vesicles.

In filtering aerosols, such filter mediums gradually become moistened, even to the point of wetting.

The degree of purification of a contaminated gas is measured in terms of the decontamination factor $F_D$ equal to the ratio of the activity present in the incoming mass of gas to the residual activity in the same mass of outgoing gas. When the filter is wetted, $F_D$ tends to unity and the barrier role of the filter with respect to the contamination is nullified.

This phenomenon can sometimes appear quite rapidly (after ten or so hours) especially if the transferred solutions are hot, and in general after about 100 hours. This is too soon, compared with the normal fouling time of the filter which is roughly at least 3 months.

It is thus necessary to proceed with frequent replacements of the filter elements, something which is costly, which multiplies the number of (rather complex) radioactive material and/or contaminated material handling operations and increases the quantity of wastes to be treated.

Hereto, attempts have been made to solve this problem by lowering the humidity of the gas and the quantity of liquid vesicles (mist) in the gas to be filtered.

Several solutions have been tried. The first consists in replacing the mist eliminator by a better-performing mist eliminator (choice of materials, design concept, etc.). It was also proposed in a 2nd solution to pass the aerosol through a condenser-cooler placed before the mist eliminator, in order to lower the dew point of the aerosol and swell its particles, which improves the eliminator's throughput. In accordance with a 3rd solution, used alone or in combination with the 2nd solution, the aerosol leaving the mist eliminator is heated by convection in a heating appliance before being filtered, such as to vaporize the liquid vesicles and superheat the gas in the heating appliance. A gaseous phase then passes through the filter, which gaseous phase is laden with solid contaminating particles which are retained by the filter medium.

Unfortunately, the replacement or addition of an apparatus in existing lines is not always possible, suitable space having not always been provided for the purpose. Moreover, such an operation requires decontamination, shutdown of the installation and like precautions, and it is costly.

Another disadvantage is that these additional apparatus must be installed in the cell separated from the outside by a biological and/or radiological protection wall. Due to the disallowance of human access to the cell, cleaning and maintenance of the apparatus are difficult and costly. What is more, their presence requires a greater volume for the cell, more powerful ventilation of the cell and greater dimensions for the biological and/or radiological protecting walls, which further increase the cost.

Accordingly, a cost-effective and efficient solution was sought which:

does not require additional equipment in the cell inaccessible to humans, the process and device are used with the conventional filters, can he easily maintained from the man-accessible zone, and does not increase the volume of the installations.

It was also sought to make this solution easy to implement in existing installations, either to improve their performance or to meet new needs.

SUMMARY OF THE INVENTION

For these purposes, the invention, subject of this application, proposes a method for efficiently purifying contaminated gases and a device implementing said method and meeting all the specific requirements of the nuclear industry.

More specifically, the inventor has found a method of filtering a contaminated gas laden with liquid vesicles (i.e. an aerosol) through a filter medium arranged around a central hollow through which said aerosols enters, a method whereby the filter medium is heated to a temperature above the aerosol's dew point by means of a radiant heat source provided within said center hollow.

In filters used in a nuclear environment, and more specifically in vacuum circuits the filtering mass is disposed in a continuous manner around a center hollow such that the aerosol to be filtered enters said hallow, then traverses the filter medium.

Means are of course provided so that the incoming, contaminated aerosol is directed solely to the center hollow and the clean, outgoing gas is discharged without any possibility of contact between the clean gas and the contaminated aerosol.

The center hollow is generally given a cylindrical shape with a circular cross section, although any other cross sectional form is possible, including ellipsoidal, hexagonal, etc.

The filter medium is that commonly chosen by one skilled in the art to suit the specific contaminated aerosol to be filtered. The invention is applicable to any filter medium capable of retaining solid radioactive particles, provided it withstands the prevailing heat. The materials routinely used in the nuclear field are sintered metals (for example stainless steel), ceramics, fibrous materials, cellulose, fiber-coated paper and the like. The invention can be applied to high or medium efficiency filters as well as to very high efficiency filters.

The filter medium can be arranged within the filter in a perforated enclosure allowing the aerosol to pass or, more often, the filter medium has sufficient mechanical strength to make necessary the use of an enclosure.

The parts of the filter traversed by the gas, including the filter medium alone or the medium together with the perforated enclosure, shall be referred to as the "filtering body".

According to the invention, a radiant source is arranged inside the filter, in said center hollow, away from the filter medium and without direct contact therewith. It heats the filter medium directly by radiation and/or the thermal radiation heats the conductive perforated enclosure which transmits this heat to the filter medium.

The filter medium is heated to a temperature above the aerosol's dew point.

This means a transfer of heat solely by radiation between the source and the filter mass.

It is recalled that in the transfer of heat through radiation, the kinetic energy lost by the source is recovered in the form of an electromagnetic radiation, part of which energy is absorbed by the filter medium and heats it.

The power of the emitted heat radiation P is proportional to the temperature difference raised to the power of 4, between the source and the medium:

$$P = k\Delta T^4.$$

On the contrary, the transfer of heat through conduction corresponds to a diffusion of the heat through a continuous medium with creation of a "stream" of heat circulating so as to obtain a homogeneous distribution of the kinetic energy according to the law P=k T.

It is therefore clear that the present invention uses the transfer-through-radiation method, avoiding as much as possible the transfer through conduction between the radiant source and the housing (containing the filter medium and the source) particularly by placing a heat-insulator between the source and said housing, so as to prevent thermal coupling between the filter medium and the source.

The fact of adopting such a heat transfer method, according to the invention, leads to:

an even temperature of the filter medium through the temperature self-distribution phenomenon, a vaporization of the liquid vesicles coming into contact with the filter medium, while leaving in said medium the solid phase contaminants, What emerges from the filter is strictly a gas phase laden with the vapor of the liquid(s) of the liquid vesicles and if the liquid phase was water, strictly a wet gas.

The prevailing temperature of the filter medium and the gas flow rate through the thickness of the said medium are enough to prevent recondensation of the vapor(s) in said medium.

Moreover, in the case of diathermanous gas (for example, air), the radiant heat is absorbed first by the liquid vesicles which use it to evaporate, the gas hardly warming at all.

In this case, the radiant energy is used to a maximum.

The choice of a radiant source and its arrangement are determined according to the filter medium used, its thickness and the technology of the filter.

The medium must withstand the prevailing heat. If a sintered metal medium is used, it can be heated by an electric resistance placed in a thermowall-like or glove-finger-like sheath. If however a paper medium is used, an infrared lamp can serve the purpose and its use may or may not be adequate, depending on the application chosen for the filter. Thus, in a nuclear environment and an inaccessible area, the latter use cannot be envisaged due to the presence of glass, which might break, in the lamp bulb.

The temperatures reached at any points of the filter (filter medium cum enclosure and other parts) must be compatible with the mechanical behavior of these components. Elastomer seals are the most problematic: they fail to ensure adequate sealing with sufficient certainty at temperature above 80° C. to 100° C. or so. Precautions can be taken however, in the way of avoiding thermal bridging (heat transfer by conduction) or in the arrangement of the sources.

Contrarily to the prior art, the quantity of liquid vesicles present in the gas entering the filter is of no importance. The method according to the invention can be used as well after liquid-gas separation in a mist eliminator as without. The latter case is particularly worthwhile: the method is adaptable to existing installations that might not include a mist eliminator.

The invention can apply to any gas, in particular to air, and to any aerosol (water, solvent, acid or other vesicles) as long as neither presents a dangerous instability at the temperatures prevailing in the filter. Thus, are to be excluded for this reason inflammable organic solvents such as tribunal phosphate (flash point: = 146° C.).

The aerosol to be filtered may also contain solid particles (undissolved), whether contaminating or not. These do not interfere with application of the invention and are retained by the filter.

The gas may circulate at variable pressures. It is in fact only required to traverse the filter medium the pressure difference between the entry and exit from the medium being maintained, for example, by placement of the installations under a reduced pressure by means of a vacuum apparatus placed downstream of the filter, or by pressurizing the entering gas. This is the usual technique of filtering gases.

The invention also proposes a device implementing the inventive method and which adapts, i.e. can be retrofitted, to existing filters.

More exactly, the invention provides a filter to effect filtration of a gas laden with contaminating liquid vesicles, said filter being placed in a biological and/or radiological protection enclosure in a wall of which has been prepared a suitable opening, said filter consisting of the following parts:
- a housing equipped with an inlet for the gas stream and a peripheral outlet through which the gas exits, and means for attachment to said biological and/or radiological wall,
- a filter element proper which is removably arranged in said housing and consists of a filtering body arranged around a center hollow through which flows the gas stream to be filtered, and comprising a plate at each end, one of which plates is provided with an opening for entry of the gas at the level of the hollow; and sealing means between said filter element and the housing's inlet,
- a removable biological and/or radiological protection plug blocking the opening in the biological and/or radiological protection wall and allowing, when it is removed, access to the filter element, said filter wherein
- the plate of said filter element nearest the biological and/or radiological protection plug comprises a metal wall forming a glove-finger-like sheath in the center hollow of the filter element,
- a heating means is arranged in said sheath, thanks to a bore provided in the plug in line with the sheath, said heating means thus being able to be removed, from the outside, separately from the filter element, the core having its own biological and/or radiological protecting means.

The inventive filter device will now be described in greater detail with reference to FIG. 2, which is a sectional drawing of a preferred embodiment of the invention. This figure shows a filter that is removable vertically upwardly, as is commonly used in vacuum-type airlift systems. Such vertical arrangement of the filter makes the filter easier to handle, but is not a necessary feature for implementing the method of the invention.

DESCRIPTION OF THE PREFERRED EMBODIMENT

The filters responsible for retaining the contamination are placed within biological and/or radiological protecting walls defining an enclosure through which walls ionizing and/or contaminating radiation cannot pass, thus protecting the outside. The walls are designed to bar the specific type of radiation involved.

Figure 1:
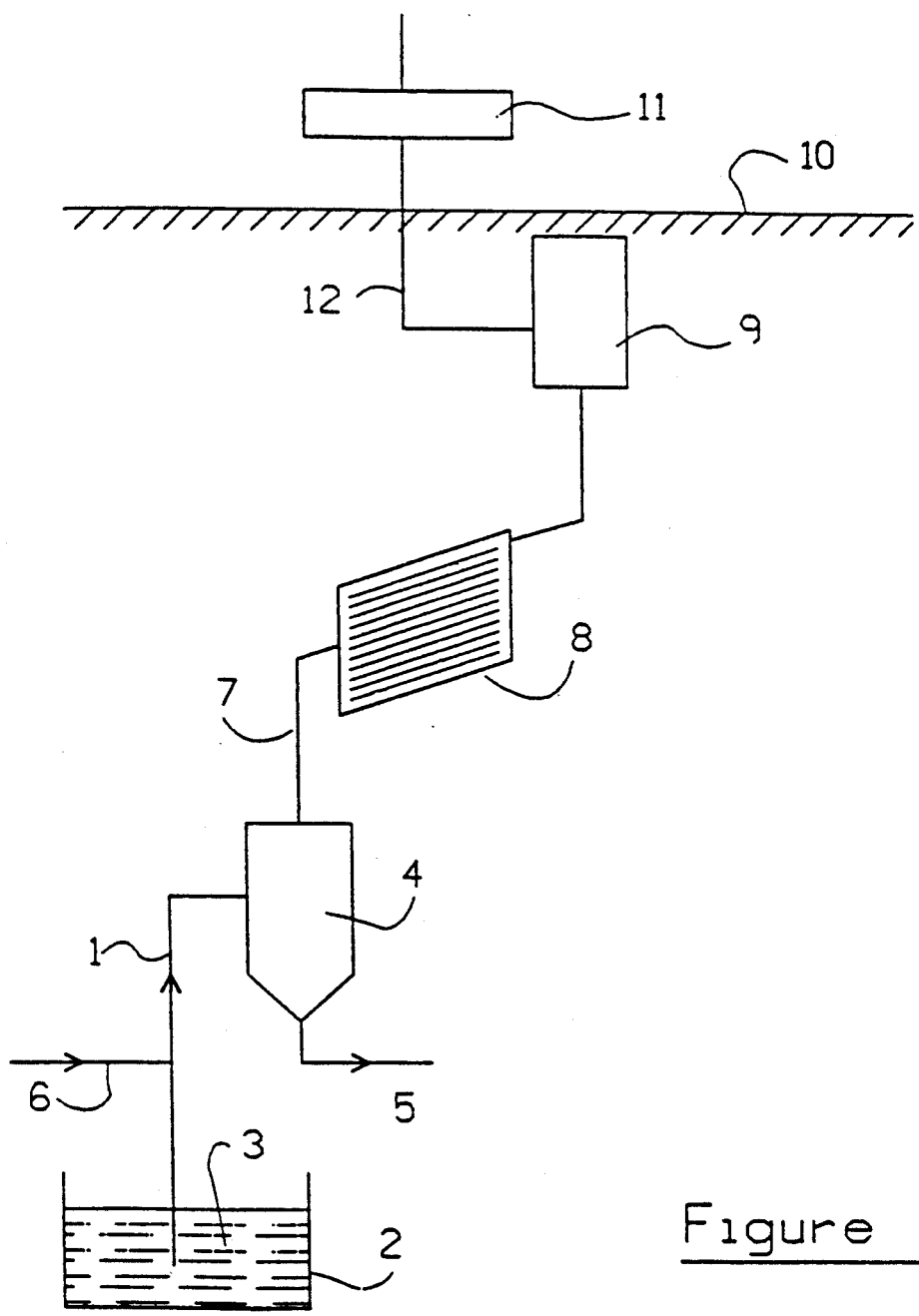
FIG. 1 represents the prior art mentioned above.
Figure 2:
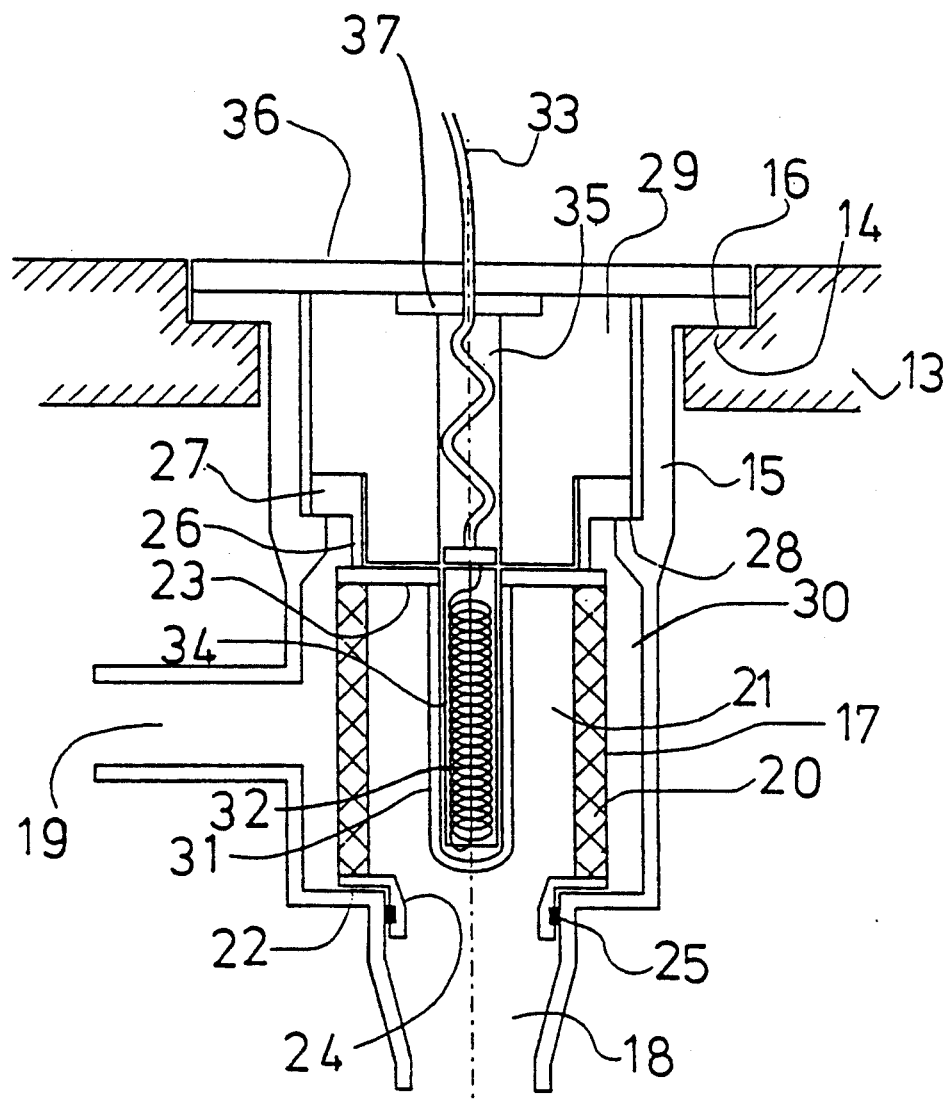

The filter represented in FIG. 2 is placed under a biological and/or radiological protection slab 13, in which an opening is provided, having a shoulder 14 on which the housing 15 bears, by its matching shoulder 16.

The housing 15 is thus suspended from the slab. Other ways and means of installing the housing within the biological and/or radiological protection wall may be envisaged within the scope of the invention.

The housing 15, containing the filter element 17, is generally made up of metal walls. It is provided with three openings: one for passage of the filter element, which is introduced from the accessible zone, through the opening in the slab, and the other two corresponding with the gas inlet 18 and outlet 19. The latter two openings as represented in FIG. 2 comprise projecting tubes for connecting the gas pipes.

The filter element 17 comprises the following parts:
- a filtering body 20 with a hollow 21. In the embodiment of FIG. 2, the filtering body is given an annular, cylindrical shape to define the center hollow 21 of circular cross section; however, the hollow can be ellipsoidal, square or otherwise in cross section. The filtering body has a constant thickness.

In the embodiment of FIG. 2, the filtering body consists solely of the filter medium itself, this being a sintered metal with sufficient mechanical strength to avoid the need for using a perforated supporting enclosure. When such filter medium supporting enclosure is necessary, it is made up of two concentric cylindrical walls forming variable cross sections, the filter medium filling the space between the two said walls and said walls being perforated to allow gas to pass therethrough;
- two plates 22, 23 arranged at the ends of the filtering body and closing off the hollow. The plate arranged facing the gas inlet 18 to the housing, i.e. the bottom plate in FIG. 2, is provided with an opening 24 to allow the gas to flow into the hollow of the filter element. Sealing means 25, such as elastomer O-rings for example, are provided between the tube portion of the housing and the opening in the plate;
- means for fastening the filter element in the housing. In FIG. 2, the element is suspended from the housing. For this purpose, a cylindrical metal part 26, with same axis as the cylinder of the filtering body, is attached to the plate nearest the biological protecting wall, i.e. the top plate 23, said cylindrical metal part ending in a flange 27 whose shoulder bears on a matching shoulder 28 on the housing.

The mounting just described is advantageous, but other means of linking the housing and the element are possible.

Sealing means are provided between the flange 27 and the housing; in the preferred embodiment, these means are seals (not shown) compressed by the weight of the plug.

In accordance with FIG. 2, the vertical filter element is kept in place within the housing by the plug 29 whose weight bears on the flange 27 and the housing's shoulder 28.

In a general way, alternative means of keeping the element in place can be used, specifically for example, remotely removable fastenings, regardless of the position of the filter (vertical, horizontal, inclined).

The gas entering the housing via inlet 18 goes directly into the hollow 21 in the filter element 17, through the latter's opening 24, then traverses the filtering body 20 and flows into the space 30 between the housing and the element and finally goes out through the peripheral outlet 10 of the housing.

The filter element can be inserted or taken out of the housing from the human-accessible zone (outside the biological and/or radiological protection enclosure) thanks to a plug 29 inserted in the biological and/or radiological protection wall 13. The plug may be made of the same material as the wall, or of some other material.

When in place, the plug ensures continuity of the biological and/or radiological protection along the wall 13. Handlings of the plug and filter element are carried out from within suitable moving enclosures (such as that described in French patent No. FR 2 560 710) which ensure integrity of the biological protection.

To be sure there is no contamination of the parts of the housing located above the plane of the seal 27 and the top surface 23 (that facing the biological and/or radiological protection wall) of the filter element, especially during filter element installation or retrieval operations, said element is made fast with the plug at the level of the flange 27 of said element, by welding for example.

This feature is not an absolute necessity.

The plug's removal provides access to the filter element. When the plug and filter element are provided as separate parts, the element is inserted and retrieved by some gripping means. When plug and filter are fast to one another, removing the plug brings the filter element outside and another plug and element assembly is inserted, or means are provided so that the element alone can be exchanged whilst keeping the same plug.

The filter described herein is, of itself, known. In order to solve the problem posed of filtering gas laden with contaminating liquid vesicles, by means of a simple device, easy-to-maintain from the human-accessible zone, without modifying an existing installation, the invention proposes to install in the hollow of the filter element a heating means in a glove-finger-like sheath, hereinafter termed merely "sheath", and to make in the biological and/or radiological protection plug a bore having its own biological protection means and enabling handling of said heating means independently of the plug and/or filter element, without the need to use an associated moving enclosure.

The radiant source for implementing the method according to the invention consists of a glove-finger-like sheath 31 containing a heating means 32. According to FIG. 2, the heating means is an electric resistance element 32 with its power supply leads 33 embedded in a heat conducting cement 34 which isolates it from the sheath and imparts it some mechanical strength.

The resistance is supplied by means of the wires 33 connected to a current source located outside the biological and/or radiological protection enclosure.

More exactly, a sheath 31 has been attached on the filter element plate 23 nearest the biological protection wall, said sheath consisting of a finger-shaped metal wall which extends into the hollow of the element and preferably the whole length of the filter medium.

In this embodiment, the electric resistance element transmits its heat to the cement, which transmits it to the sheath wall, which in turn radiates to the filtering body.

It is ascertained that the thermal bridging between the radiant source and the filter element is poor in order to reduce the heat transferred by conduction. Thus, the sealing means between the housing and the element (elastomer seals for example) are protected.

Other arrangements may be found. The electric resistance can be replaced by other heating means (for example, an infrared lamp) able to be supplied from outside the enclosure, the leads then being routed through the plug. In a general way, the radiant source is selected to suit the temperature desired for the filter medium, the allowable temperatures for the medium and the other filter components and other nuclear operating requirements.

The heating means placed in the sheath is kept clean (free of contamination) and can be manipulated with fewer precautions than the filter element, and independently of said element besides.

To improve the dispersion of the aerosol to be filtered entering the filter element and the dispersion of heat, fins can be provided on the outside wall of the sheath.

A bore 35 is made in the plug 29 along the same axis as the sheath to allow passage of the heating means power supply leads if necessary and especially to enable manipulation of said means independently of the plug and of manipulations of the filter element. Obviously, the plate of the filter element to which the sheath is mounted is likewise bored (opening of sheath).

The bore 35 must have its own biological and/or radiological protection means.

As shown in FIG. 2, the bore 35 is made in the biological protection plug 29; it has a diameter substantially equal to that of the sheath. The top of the bore contains a filling of small lead shot (in an envelope), omitted from the drawing. The heating means+wires+filler assembly is handled from a position in the accessible zone, after removing the plate 36 (which provides continuity and flatness to the surface of the slab 13). and by simple gripping of the heating means equipped with its supply (wires in FIG. 2), said means then simply sliding in the bore.

The device according to the invention solves the problem of filtering aerosols by implementing the method also claimed. It is easy to manufacture and to maintain and requires no modification of the process installation. The usual operations involved in filter maintenance are unaffected. Simply, the heating means must be removed to reach the filter element.

The said device illustrated in FIG. 2 has been tested in a vacuum airlift.

The liquid to be transferred is an aqueous solution of 10 g/l of fluorescein raised to 50° C. The driving air flows at the rate of 1480 Nl/h. A vacuum of 6 m water column prevails at the pump. The submergence is 40%. The amount of liquid transferred is theoretically 825 l/h.

The filter is that represented in FIG. 2. The filter medium is 3µ sintered stainless steel commercialized under the "Poral" trademark by the Ugine company.

The temperature prevailing at the mist eliminator is 44° C.

The temperatures at filter level are as follows:
at the entrance to the filter, 36.8° C.,
ambient air, 26.7° C.,
at the outlet from the filter, 41° C.,
on the housing, 57.6° C.,
on the surface of the resistance element, 492° C., on the filtering medium: 111° C. (the medium has remained dry).

at the bottom seal, 47.3° C., at the top seal, 64° C.

The $F_D$ is 273. The test lasted 55 hours.

Thus the desired result is obtained with just such a method and very simple device namely:

the filter keeps its full efficiency in the presence of liquid vesicles, one can do entirely without the mist eliminator upstream of the filter, the method can be applied even in reduced pressure circuits in which the water content of the low-pressure saturated gas is greater than that of the high-pressure saturated gas, the device is very low-cost, the device is more cost-effective in operation than the air heater because it takes less energy to keep the filter medium at a temperature above the dew point by direct heating than heating and evaporating the moisture from a gas, retrofitting is easy on all types of existing filters, merely by providing a cavity in the filter element—a cavity which already exists in most filters used in the nuclear environment—then boring the plug and sealing it with known means of biological and/or radiological protection, no action in an active environment is required.

no complication is added to the handlings of the filter element.

I claim:

1. Method for filtering a contaminated gas laden with liquid vesicles, otherwise called an aerosol, through a filter medium arranged around a center hollow through which the aerosol enters, whereby said filter medium is heated to a temperature higher than the dew point of the aerosol by a radiant source arranged in said center hollow.

2. Method according to claim 1, wherein the filter medium used is made of sintered metal.

3. Method according to claim 1, wherein the filter medium is a ceramic.

4. Method according to claim 1 whereby the gas is made to flow at reduced pressure.

5. Method according to claim 1, involving very high efficiency filtering.

6. Method according to claim 1, whereby the gas, prior to being filtered, goes through a mist eliminator.

7. Method according to claim 1, whereby the gas to be filtered is air coming from an installation for the transfer of liquid by air lift.

8. A filter placed in an enclosure protecting an outside, human-accessible zone against either or both of biological and radiological contamination by a contaminated gas laden with liquid vesicles, in a protection wall of which enclosure has been prepared a suitable opening, said filter consisting of the following parts:

a housing equipped with an inlet for the gas stream and a peripheral outlet through which the gas exits, and means for attachment to said protection wall, a filter element proper, which is removably arranged in said housing and consists of a filtering body arranged around a center hollow through which flows the gas stream to be filtered, and comprising a plate at each end, one of which plates is provided with an opening for entry of the gas at the level of the hollow and sealing means between said filter element and the housing's inlet, a removable contamination protection plug blocking the opening in the protection wall and allowing, when it is removed, access to the filter element, wherein the plate of said filter element nearest the protection plug comprises a metal wall forming a glove-finger-like sheath in the center hollow of the filter element, a heating means is arranged in said sheath which communicates with a bore provided in the plug in line with the sheath, said heating means thus being able to be removed, from the outside, separately from the filter element; the core having its own means for protection against either or both of biological and radiological contamination.

9. Filter as claimed in claim 8, wherein the heating means consists of an electric resistance supplied by wires.

10. Filter as claimed in claim 8, wherein the heating means is an infrared bulb.

11. Filter as claimed in claim 8, wherein the filter element bears by a flange portion on a shoulder on the housing suspended from the biological protection slab, sealing between said filter element and said housing being obtained by compression of seals by the action of the weight of the biological protection plug and wherein the bottom plate has an opening for entry of the gas stream, the top plate carrying the sheath.

12. Filter as claimed in claim 8, wherein said plug is made fast with the filter element so that the two can be inserted and removed together.

* * * * *